(12) United States Patent
Brown (10) Patent No.: US 7,891,930 B2
(45) Date of Patent: Feb. 22, 2011

(54) HYDRAULICALLY DRIVEN CONVEYOR

(76) Inventor: William Brown, 21320 Harbeson Rd., Harbeson, DE (US) 19951

( * ) Notice: Subject to any disclaimer, the term of this patent is extended or adjusted under 35 U.S.C. 154(b) by 744 days.

(21) Appl. No.: 11/612,460

(22) Filed: Dec. 18, 2006

(65) Prior Publication Data

US 2009/0285643 A1    Nov. 19, 2009

Related U.S. Application Data (60) Provisional application No. 60/759,414, filed on Jan. 17, 2006.

(51) Int. Cl.
  *B65F 1/00* (2006.01)
(52) U.S. Cl. .......................... 414/507; 406/41; 406/42; 406/153
(58) Field of Classification Search ................. 414/502, 414/920, 914, 676, 679, 526, 518, 510, 509, 414/507, 467; 406/39, 40, 41, 42, 43, 44, 406/113, 151, 153; 180/53.1, 53.3, 53.4, 180/53.6, 53.61, 53.62, 53.7, 165; 280/421
  See application file for complete search history.

(56) References Cited

U.S. PATENT DOCUMENTS

| | | | | |
|---|---|---|---|---|
| 3,712,404 A | * | 1/1973 | Walquist | 180/212 |
| 3,751,892 A | * | 8/1973 | Quanbeck et al. | 56/344 |
| 3,768,679 A | * | 10/1973 | Lundahl | 414/502 |
| 3,840,134 A | * | 10/1974 | Luscombe | 414/501 |
| 3,859,741 A | * | 1/1975 | Reinhardt | 37/420 |
| 3,885,375 A | * | 5/1975 | Solterbeck | 56/15.6 |
| 4,069,648 A | * | 1/1978 | Taylor et al. | 56/27.5 |
| 4,193,249 A | * | 3/1980 | Tackett | 56/11.9 |
| 5,001,893 A | * | 3/1991 | Stanley et al. | 56/328.1 |
| 5,100,281 A | * | 3/1992 | Grieshop | 414/526 |
| 5,121,775 A | * | 6/1992 | McClain | 141/83 |
| 5,193,331 A | * | 3/1993 | Quandt | 56/12.8 |
| 5,282,713 A | * | 2/1994 | Lande | 414/412 |
| 5,407,042 A | * | 4/1995 | Fukui et al. | 192/3.58 |
| 5,628,608 A | * | 5/1997 | Linscheid et al. | 414/526 |
| 5,765,650 A | * | 6/1998 | Checkel | 172/681 |
| 5,840,102 A | * | 11/1998 | McCracken | 95/268 |
| 6,644,003 B1 | * | 11/2003 | Bass | 56/12.8 |

\* cited by examiner

*Primary Examiner*—Saúl J Rodríguez
*Assistant Examiner*—Glenn Myers
(74) *Attorney, Agent, or Firm*—Jeffrey C. Lew (57) ABSTRACT

A residual feed pick-up system for poultry farming utilizes a tractor and trailer combination in which the blower for a pneumatic conveyor is mounted on the trailer. The hydraulic motor that drives the blower is also located on the trailer. Feed pick-up can be effected by the trailer accompanied by a standard over-the-road tractor equipped with a conventional and economically available hydraulic power takeoff unit commonly known as a PTO. The feed supplier to the poultry farm can use any of such commonly configured tractors in its normal operating fleet combined with the trailer having the onboard hydraulically driven blower for low-volume, residual feed pick-up service, thereby increasing reliability and availability of the service at advantageously low cost.

10 Claims, 5 Drawing Sheets

HYDRAULICALLY DRIVEN CONVEYOR

This application claims benefit of U.S. provisional patent application No. 60/759,414 filed Jan. 17, 2006.

FIELD OF THE INVENTION

This invention relates to bulk transfer of material via tank trailers between storage locations. More specifically it pertains to bulk transfer of granular poultry feed from numerous satellite storage tanks to a central supply depot using tank trailers equipped with hydraulically driven pneumatic conveyors.

BACKGROUND OF THE INVENTION

Large scale poultry farming involves raising vast numbers of birds, typically in a flock of thousands, living communally in fixed structure shelters, ("houses"). The flock remains together and does not move from a single house during nearly its entire growing cycle extending from the age of young chicks until harvesting as adults. Feeding the animals is, of course, a critical aspect of the operation and it can involve the transfer of very large quantities of food.

The industry typically utilizes granular feed which the grower purchases in bulk from a feed supplier. The feed is delivered to the farm and is deposited by the supplier into one or more on-site storage bins local to the poultry houses. From time to time, as feed is dispensed to the birds from the local bins, it is replenished by the supplier. During the growing cycle, the birds require different feed formulations that correspond with their stage of maturity and further depend on other factors determined by the grower. Accordingly, the composition of the feed delivered by the supplier will change during the growing cycle.

Normally at harvest time, mature birds are removed to a processing plant leaving the formerly occupied house vacant. The house is then prepared for occupancy by a new crop of young birds. Frequently there is a residual quantity of adult formulation feed in the bins of the recently vacated houses. This feed is not suitable for the incoming chicks. The grower calls on the supplier to remove residual food from the bins. The grower gets a refund for returned feed and the bins are emptied so they may be re-stocked appropriately.

Feed is usually transported in bulk transfer cargo trailers equipped with large tanks and pulled by standard over-the-road tractors. The supplier ordinarily maintains a fleet of tractor-trailer combinations of size appropriate for delivery of feed to the grower-customers. Picking up residual feed from vacated poultry houses is a necessary but usually smaller volume aspect of the supplier's business. Normally only a small portion of the supplier's fleet consists of specialized tractors and trailers dedicated to residual feed pick up service.

Traditionally trailers of the pick-up fleet basically have a tank for accepting the residual feed, a pick-up conveyor system for loading the residual feed to the top of the tank and another discharge conveyor system for unloading the feed from the bottom of the tank. The trailer has no loading or unloading drive power source of its own to motivate the pickup and discharge conveyor systems.

A specially equipped tractor is dedicated to pick-up trailer service. In addition to its normal operating equipment, the special tractor has a blower to provide pneumatic conveying air for the pick-up conveyor system of the trailer. This tractor also has an added mechanical drive for the blower. The mechanical drive takes power from the drive transmission of the tractor's main engine. Thus the step of removing residual feed calls for bringing a trailer to the site with a specially equipped tractor, running the tractor engine to operate the blower, and transferring the residual feed from the bin to the trailer tank with the pneumatic conveyor using air provided by the tractor-mounted blower.

This conventional feed pick-up system has commercially significant drawbacks. Firstly, existing tractors with pick-up capability are more expensive to outfit than standard tractors. The blower must be driven by the mechanical link to the tractor transmission. Therefore at least one tractor of the fleet must have a transmission specially equipped with the mechanical link. This can contributes substantially to the cost of the tractor because the mechanical link is an specially added tractor feature. Additionally, the supplier has to inventory special replacement parts and to undertake specialized maintenance procedures to keep pick-up service capable tractors in good repair.

Secondly, conventional feed pick-up vehicles create certain logistical problems for the supplier. Feed suppliers prefer to have a low number of specially equipped pick-up service tractors. This is because these tractors are more expensive than standard tractors and the relatively low volume of feed pick-up service compared to normal feed delivery service does not justify having more than a few, minimally essential units in the fleet. However, pick-ups can occur at difficult to predict times and must meet the needs of the growers' schedules. Consequently the supplier prefers to have a pick-up tractor/trailer combination available at nearly all times. The high availability is frequently satisfied by dedicating at least one tractor/trailer combination exclusively to residual feed pick-up despite the low volume of use. This can lead to suppliers overextending the time in service of the pick-up capable tractors which tends to induce more frequent unexpected breakdowns of aging equipment. In short, it is logistically difficult and relatively expensive for the feed supplier to maintain its part of the fleet of vehicles exclusively dedicated to residual feed pick-up service.

Another flaw of many conventional feed pick-up fleet systems is that a rubber belt coupling is commonly included in the link between the tractor engine transmission and the blower. The coupling produces a stepped up shaft rotation speed to properly operate the blower. Accidentally from time to time either mechanical failure or operator error can cause the pneumatic conveyor transfer lines on the pick-up trailer to occlude with feed particles. The tractor transmission will continue to turn with the blower dead-headed against the plug. Unless the operator reacts quickly, damage to the blower can result. Usually the rubber belt overheats and breaks. The cost of the broken belt is not trivial, but perhaps more problematic is the expense due to time required to access and replace the broken belt with a new one.

It is desirable to have a residual feed pick-up fleet system that uses more, if not all, standardized mechanical components and is logistically more flexible to operate. A system in which the supplier can use any unit of its normal tractor fleet to operate a feed pick-up trailer would be a great productivity advantage. It is also desired to have a system that has fewer special parts to stock and requires less specially trained mechanics to maintain in good operating condition. A system that is less costly to purchase, maintain, repair and operate than conventional residual feed pick-up subsystems is much desired.

SUMMARY OF THE INVENTION

The residual feed pick-up system of this invention utilizes a trailer that includes a blower for the pneumatic conveyor mounted on the trailer rather than the tractor. Additionally, the technique for motivating the blower is hydraulic rather than mechanical. Thus feed pick-up service provided by the novel trailer avoids the operational expense of having to provide a customized, very costly tractor dedicated exclusively for pick-up service. Also, because hydraulic power operates the trailer-mounted blower, a hydraulic power supply unit which is usually a standard feature or very common accessory of many commercial over-the-road tractors can be utilized to drive the blower without radical vehicle customization. Moreover, bulk feed delivery tractors which pull cargo tank trailers of poultry feed to growers usually already have hydraulic power supply units that can energize auxiliary trailer equipment such as unloading screw conveyors. This will be explained in greater detail, below. Indeed, according to this invention the pick-up trailer can be built or easily modified such that a single tractor-mounted hydraulic power supply unit alone can operate all of the trailer-mounted hydraulically-energized equipment including the blower. Still further, the existing hydraulic power supply unit on typical poultry feed delivery service tractors should be capable of operating the novel pick-up trailer without significant modification. Hence, it is likely that many, if not all, of the tractors in a feed supplier's fleet will be suitable to work with either delivery service trailers or the novel trailer for residual feed pick-up service, thereby increasing reliability and availability of supply and pick-up services while lowering cost.

Accordingly, the present invention provides a mobile transfer system for a flowable bulk material, the system comprising a mobile cargo trailer comprising (a) a towing connector for removably hitching the trailer to a tractor, (b) a tank which is effective to hold an amount of the bulk material, (c) a pneumatic pick-up conveyor operative to move bulk material into the tank from a source separate from the trailer, (d) a blower mounted on the trailer, the blower being operative to provide a conveying flow of air to the pneumatic pick-up conveyor, and (e) a hydraulically driven motor mounted on the trailer and close coupled to the blower such that the motor drives the conveyor.

This invention also provides a method of transferring a flowable bulk material from a source location to a destination location comprising the steps of (a) providing at least one mobile cargo trailer comprising, a tank, a pneumatic pick-up conveyor, a blower for the conveyor, a hydraulically driven motor to operate the blower, and at least one self-propelled tractor comprising a hydraulic power takeoff unit, (b) hitching the trailer to the tractor, (c) connecting hydraulic fluid hoses from the hydraulic power takeoff unit on the tractor to the hydraulically driven motor on the trailer, (d) drawing the trailer by the tractor near to the source location, (e) energizing the hydraulic power takeoff unit on the tractor, (f) activating the hydraulically driven motor on the trailer with hydraulic fluid flowing through the hydraulic fluid hoses from the hydraulic power takeoff unit thereby operating the blower on the trailer, and (g) circulating air from the blower through the pneumatic pick-up conveyor, thereby transferring the bulk material with the conveyor from the source location to the tank.

DETAILED DESCRIPTION OF THE INVENTION

Figure 1:
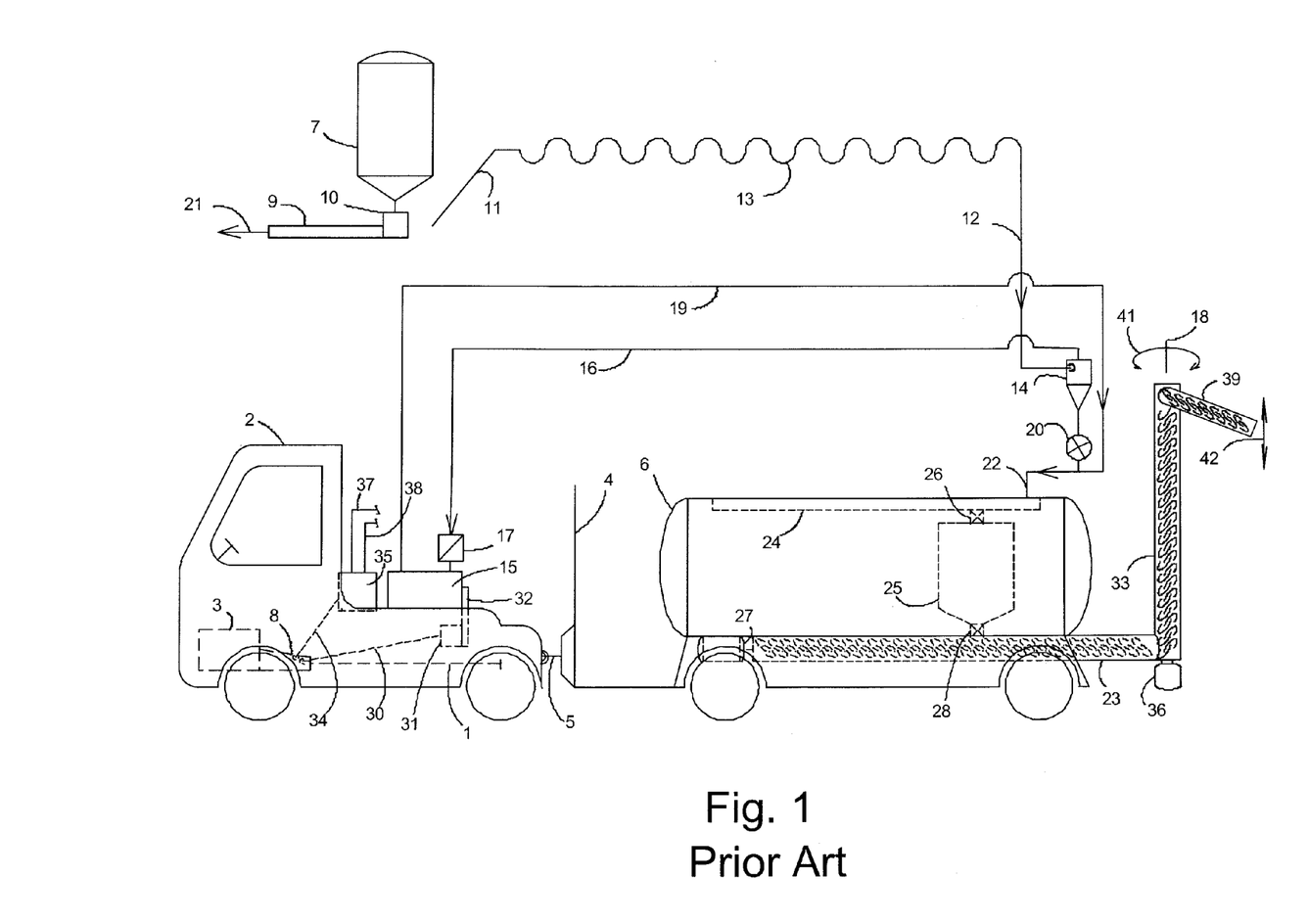
FIG. 1 is a schematic diagram of a conventional residual feed pick-up tractor and trailer of the prior art.

The present invention can be understood by comparison to a typical conventional residual feed pick-up system according to the prior art illustrated in FIG. 1. This system includes an over-the-road tractor 2 shown coupled by hitch 5 to a mobile cargo trailer 4 on which is positioned a tank 6 intended to receive and contain for transport residual feed picked up from a poultry farm. The residual feed is to be removed from storage bin 7. The feed is taken from the bin by blower 15 via transfer line 12. Direction of material flow in the drawings is shown by arrows. Blower 15 is mounted on tractor 2.

As illustrated, the residual feed in bin 7 awaits picking up. Normally while the poultry house is occupied by birds, the feed from this bin is gravity fed to solids conveyor 9. This conveyor typically includes an elongated screw rotating in a long, narrow trough. The screw is usually driven by an electric motor. The feed 21 is thus moved into the poultry house where it feeds the birds. The bin, motor and solids conveyor are permanent, stationary facilities of the poultry farm.

When the residual feed is to be taken away, an operator opens an access door of the screw conveyor intake chamber 10 allowing the feed to pour out of the bin in a pile on an adjacent pad or into a convenient open container such as a bucket. Running the tractor engine to operate the blower, suction is created in transfer line 12. This line commonly has flexible hose 13 typically about 20 ft. long and optionally terminates with a rigid hollow wand 11 of about 3-6 ft. of length. The operator places the tip of the wand into the pile of feed which pulls feed particles into the transfer line by vacuum action.

The feed particles and carrier air in the transfer line 12 under vacuum are drawn into a conventional cyclone separator 14. This separator is typically mounted at the rear end of the trailer. The solid feed particles drop to the conical section of the separator and the substantially pellet-free air flows back to the blower inlet through transfer line 16. Prior to entering the blower, the returning air passes through a filter 17 to protect the blower from damage by entrained feed or other solid contaminants. Pressurized air flows out of the blower discharge and returns to the trailer via line 19 and is used to convey the feed particles from the cyclone separator to the tank of the trailer. Because the blower transfer lines 16 and 19 extend between the tractor and the trailer, it is customary to provide fittings in these lines to facilitate their disconnection and reconnection so that the trailer can be separated from the tractor when desired. In the traditional system the tractor is usually dedicated to working with the pick-up trailer and therefore it is relatively infrequent to need to disconnect the blower transfer lines provided that the lines are sufficiently flexible to allow the trailer to pivot about the hitch 5 as it is drawn behind the tractor.

The pellets fall from the separator into a substantially pressure-sealing, rotary feed valve 20 sometimes called an "air lock" for reasons now to be explained. The rotary feed valve has a cylindrical case with an elongated, vaned impeller. The impeller is caused to rotate at an adjustable speed. Particles drop into the upward facing compartments of the impeller between vanes and travel downward through the feeder as the impeller rotates. They then fall into line 19 and are transported to the top of the trailer tank by pneumatic conveyor line 22. A pressure tight seal is maintained between the tips of the vanes and the interior wall of the case. The rotary feed valve thus provides an air lock interface between the negative pressure (vacuum) on the cyclone side of the rotary feed valve and the positive pressure of the pneumatic conveyor line on the blower discharge side.

The picked-up feed moves through a horizontal conduit 24 inside the top of the trailer tank, which is therefore shown in phantom lines. Pick-up feed cargo tanks 6 are typically divided into multiple compartments within the tank shell. Only one such representative compartment 25 is illustrated in the figures. Conduit 24 is positioned above the compartments such that the feed particles can drop into the compartments below. The operator manipulates controls (not shown) from outside the tank to open or close valves (e.g., 26) in the conduit to select the compartments to be filled by the incoming particles.

The trailer also typically has mechanical functional conveyors to discharge the picked-up feed from the trailer at the supplier's storage area or other destination. The common system of discharge conveyors depicted in FIG. 1 includes a horizontal bottom conveyor 23 disposed under the trailer tank compartments such that the operator can manipulate controls to open or close valves (e.g., 28) and thereby feed by gravity particles from selected compartments into the bottom conveyor. The bottom conveyor has an internal screw-type impeller that rotates about its central axis under motivation by motor 27. The rotating screw moves particles toward the rear of the trailer where they can flow into a vertical conveyor 33. A rotating screw-type impeller moves the particles upward to the head of the vertical conveyor which joins boom 39. The boom also contains a screw-type impeller that can convey the particles from the head to the discharge end of the boom. Screws of the vertical conveyor 33 and the boom 39 are both motivated in common by a single conveyor motor 36. Vertical conveyor 33 is able to rotate about its central axis 18 and the boom 39 can pivot about a horizontal axis at its particle inlet end near the head. The combination of independent vertical conveyor rotation and boom pivoting permits the operator to position the discharge end of the boom at any angular direction 41 from 0 to 360 degrees about axis 18 and at any elevation direction 42 in a mechanical design range within the range of 0 to 180 degrees (i.e., vertically downward to vertically upward). Such rotation and pivoting permit the largely unrestricted deployment of the boom discharge near the feed ports of storage tanks located in proximity to the tank trailer at the unloading destination. Motors for rotating and elevating the boom are not shown in the drawings and operator controls are provided at a convenient station on the side of the trailer.

The conventional blower 15 is motivated by the tractor engine drive train. Most of these components are within the tractor body and are therefore shown in phantom. The tractor engine 3 is equipped with a standard motor vehicle drive transmission 8. A drive shaft 1 transmits energy to the tractor wheels in the traditional manner. Feed pick-up trailers are customized to include a second, special shaft 30 which is mechanically coupled to blower 15. The coupling can be a direct drive with a gear box or other conventional style. FIG. 1 schematically illustrates shaft 30 operating a drive 31 for a belt positioned within belt housing 32. The belt operates on a sheave coaxial on a shaft with an impeller of blower 15 causing the impeller to rotate and move air through the blower.

Tractor 2 is additionally equipped with a hydraulic power takeoff unit, 35 occasionally referred to as a "PTO". Such apparatus will be discussed in greater detail below. Briefly by way of introduction, a PTO provides a flow of pressurized hydraulic liquid that can be used to activate various hydraulically fluid-driven auxiliary devices. In this case, the PTO of the conventional feed pick-up tractor supplies pressurized hydraulic fluid to operate the bottom, vertical and boom conveyor screws, the rotation and elevation motors for the vertical conveyor and boom and the rotary feed valve impeller. Transfer lines of hydraulic fluid for these auxiliary service functions are shown at the PTO and leading to and from the trailer symbolically by lines 37, 38.

FIG. 1 further illustrates that hydraulic PTO 35 is powered by the tractor main engine 3 and transmission 8 via a separate and dedicated linkage such as drive shaft 34. Thus the traditionally equipped pick-up service tractor requires two auxiliary drive shafts in addition to the wheel axle drive shaft 1, namely, a drive shaft 30 for blower 15 and a drive shaft 34 for the PTO. A disadvantage of this configuration are that there is congestion at the connections of the two auxiliary drive shafts to the transmission. Also there is installed on the tractor an hydraulic PTO 35 capable of providing pressurized hydraulic fluid to actuate a blower. Consequently, as will be soon more fully described, there is usually no need to provide to a standard, PTO-equipped tractor an additional PTO unit to power the trailer-mounted blower called for by this invention.

Figure 2:
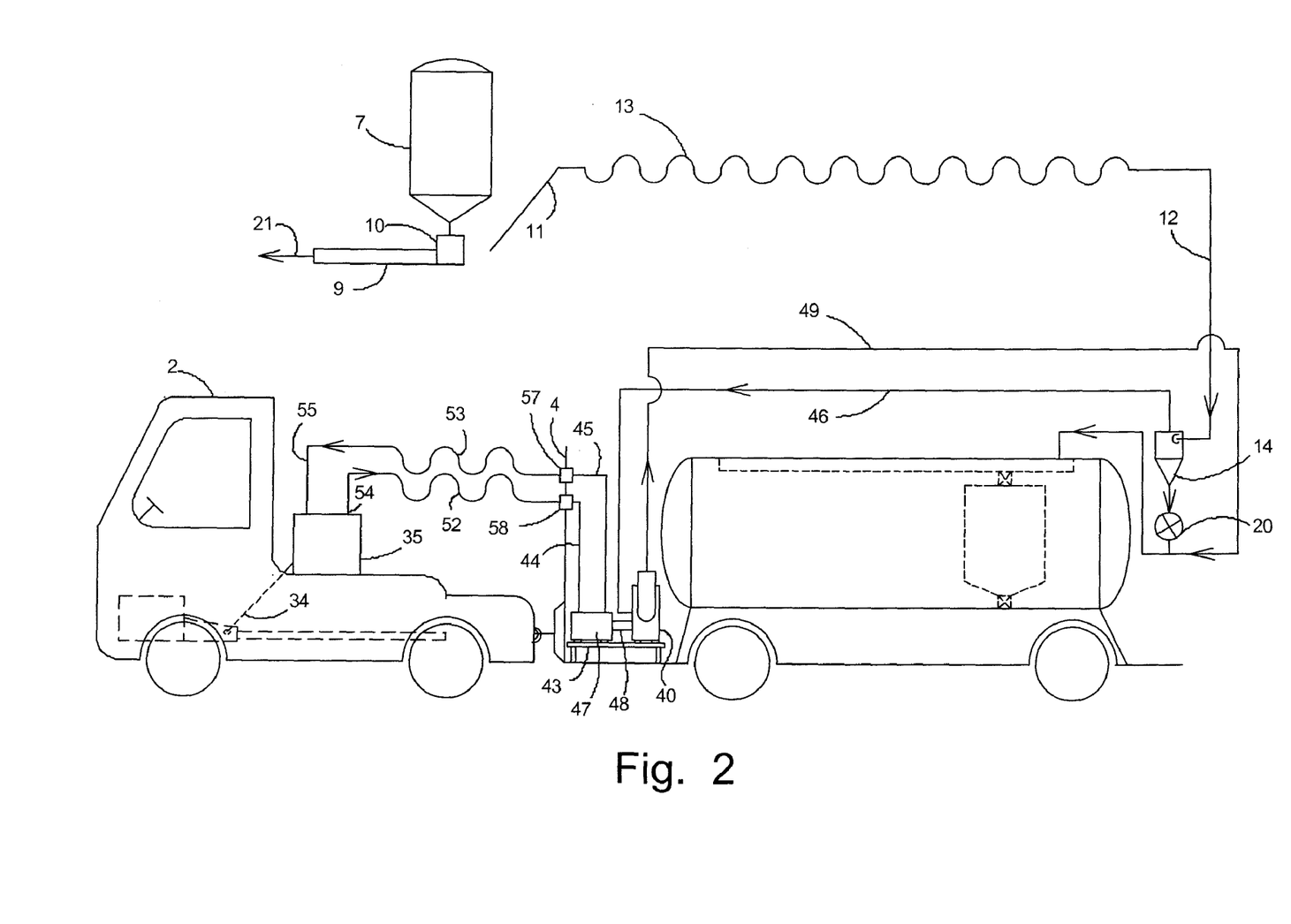
FIG. 2 is a schematic diagram of an embodiment of an residual feed pick-up system according to this invention.

FIG. 2 illustrates an embodiment of the novel residual feed pick-up system according to the present invention. In the figures, the same elements have identical reference numbers. In the novel system, blower 40 is mounted on a base 43 on trailer 4. Accordingly, the blower discharge transfer line 49 is an integral part of the trailer. For this reason, the need to disconnect the blower from the rotary feed valve 20 should be less frequent than in the conventional system and there is reduced need for a disconnection fitting in this section of the line. Of course, for maintenance purposes one or more optional disconnect fittings can be included. Similarly the blower suction transfer line 46 is part of the trailer and does not need to be disconnected and reconnected under normal circumstances except perhaps for routine maintenance.

Another major distinguishing feature of the novel system is that blower 40 is operated by a hydraulic motor 47 coupled to the blower by linkage 48. Preferably the hydraulic motor 47 is mounted on trailer 4 and more preferably it is close to the blower and positioned on the base 43. By the term "hydraulic motor" is meant a power transmission device that converts hydraulic fluid power, i.e., hydraulic liquid, usually an oil, flowing at pre-selected flowrate and pressure, to mechanical power. Preferably the output of the motor is a rotating shaft (linkage 48) that turns the impeller(s) of the blower. Thus the hydraulic motor 47 preferably is supplied by hydraulic fluid via inlet hoses represented schematically by element 44. Spent hydraulic fluid discharges from the hydraulic motor via an outlet hose 45.

Energy for motivating the hydraulic fluid through inlet and outlet hoses is generated by a hydraulic power takeoff unit 35. Significantly, the hydraulic PTO is mounted on the tractor. Moreover, the same PTO as is normally used on tractor 2 to provide hydraulic power to operate the rotary feed valve 20 and the mechanical conveyors can be used to drive blower 40. FIG. 2 shows schematically that hydraulic fluid supplied by power takeoff unit 35 exits this unit via nozzle 54 and returns vi nozzle 55. These nozzles connect to the trailer preferably by way of flexible hoses 52 and 53, respectively. The flexible hoses can attach to trailer 4 at fittings 57 and 58 through which they connect to trailer-mounted, blower hydraulic supply and discharge lines 44 and 45. In view that the hydraulic PTO is on the tractor and the hydraulic drive is located on the trailer, it is contemplated that operation of the residual feed pick-up system very efficiently will involve disconnecting a particular tractor from the trailer from time to time. Hence it is desirable to have disconnectable hose couplings for each of hoses 52 and 53. Preferably these couplings will have a quick disconnect feature to facilitate the secure connection of the hoses between drive and PTO with rapid disconnection capability. For example, fittings 58 and 57 can be quick-disconnect couplings and thereby allow the flexible hoses to rapidly disengage from the trailer when it is unhitched from the tractor. It is also seen from FIG. 3 that tractor-mounted PTO 35 is driven by shaft 34 taking power from the tractor engine transmission. Hence, the power supply requirement of a tractor for the novel feed pick up trailer is basically the same as that for a conventional delivery tractor. However, the tractor has no blower drive and no additional auxiliary drive shaft to drive the blower.

FIG. 2 does not show as separate entities the hydraulic fluid supply and return lines (37, 38, FIG. 1) which carry fluid for operating the trailer unloading conveyors, boom and rotary feed valve. Flow of hydraulic fluid between tractor and trailer now will be described in greater detail with reference to FIG. 3. This figure schematically represents the hydraulic liquid flow configuration of the novel feed pick-up system. A hydraulic PTO 70 is shown enclosed in a boundary of dashed lines to indicate that the elements within are located on the tractor. Elements of hydraulic blower 80 are shown in a second dashed line boundary to indicate that they are positioned on the trailer.

The power takeoff unit is a conventional PTO apparatus. As mentioned, with appropriate hydraulic line and valve modifications, the very same power takeoff unit already present on the residual feed pick-up and delivery tractor to operate the rotary feed valve, discharge conveyors and boom can also be used to operate the feed pick-up blower. Most tractors in a feed supplier's delivery transportation fleet also have hydraulic power takeoff units because delivery trailers normally have hydraulically powered screw conveyors and booms which they use to unload fresh feed into storage bins at the poultry farms. Hence it is now apparent that most if not every one of the supplier's fleet of tractors can be readily adapted to power a residual feed pick-up trailer with negligible modification, if any. That is, the standard delivery tractor basically has enough services to operate a pick-up trailer. The need to customize the tractor drive transmission to provide an extra take off shaft to operate the pick-up blower is thus eliminated by this invention.

Figure 3:
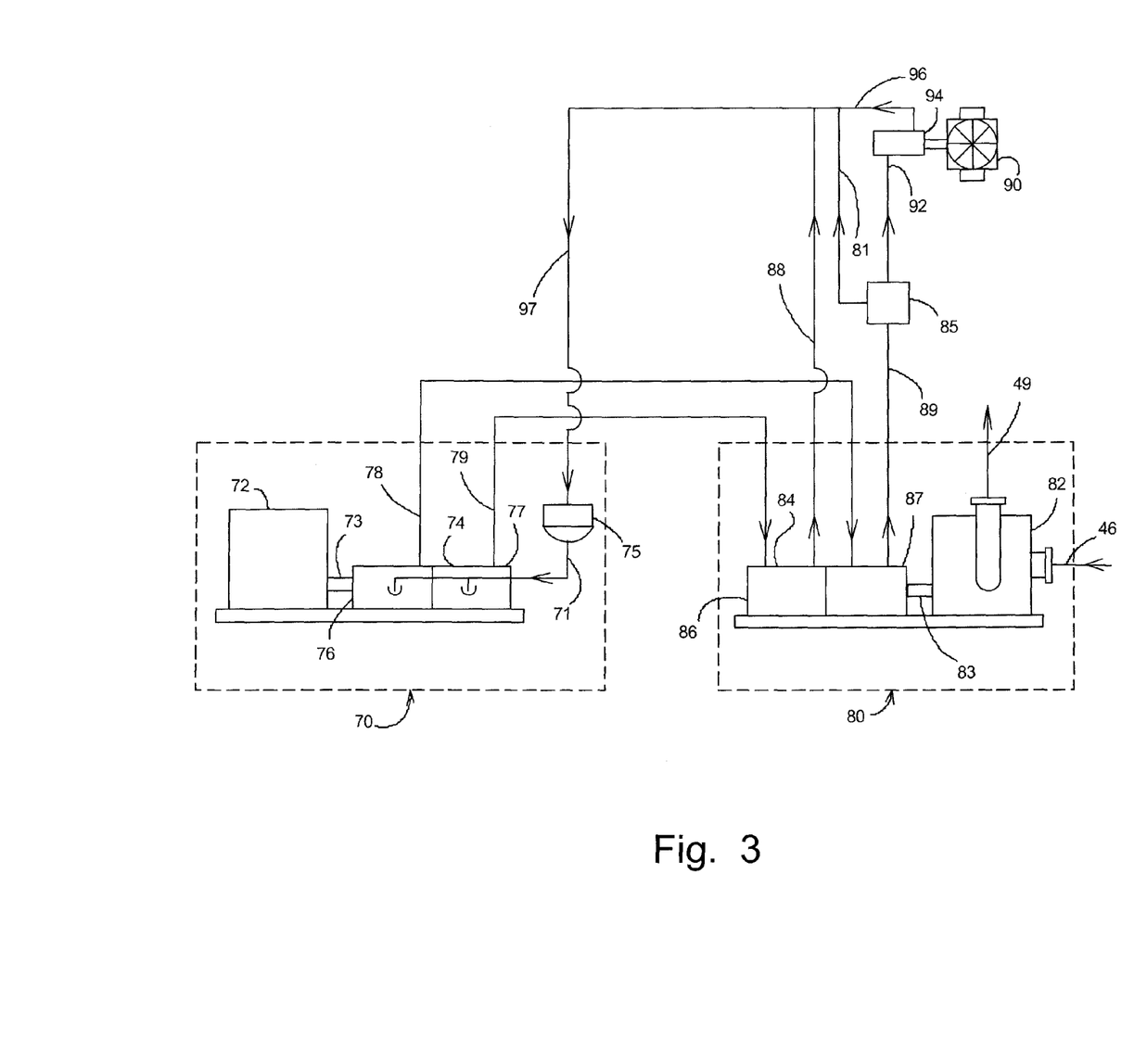
FIG. 3 is a schematic diagram of hydraulic fluid flow of an residual feed pick-up system according to this invention.

Although any standard hydraulic power takeoff unit of adequate hydraulic flow and pressure can be used for this invention, FIG. 3 illustrates the typical configuration in which unit 70 includes a gear reducer 72 joined by coupling 73 to a tandem hydraulic pump 74. The gear reducer is motivated in conventional fashion, and commonly is driven by the tractor engine (e.g., via shaft 34, FIG. 2) which provides a rotation speed at the coupling effective to operate the pump at preselected rate. The power takeoff unit alternatively can have its own power supply such as an electric motor or internal combustion engine.

By the term "tandem" with respect to the hydraulic pump 74 is meant that the pump has two separate pump heads 76 and 77 simultaneously driven by the gear reducer. While any conventional hydraulic fluid pump can be used, typically, these pumps are preferably gear-type positive displacement pumps which have multiple intermeshing lobes or toothed-gears positioned within a casing. The lobes or gears rotate within the casing to force fixed volumes of hydraulic liquid forward with each revolution. Each pump head generates its own output flow of hydraulic fluid. That is, head 76 generates a hydraulic flow through line 78 and head 77 generates a flow through line 79. Hydraulic liquid is supplied to both heads via line 71 from liquid reservoir 75.

Pressurized hydraulic fluid in lines 78 and 79 flow though hydraulic hoses (collectively depicted as 52, FIG. 2) to the trailer where they respectively enter separate parts 86 and 87 of a dual drivehead hydraulic motor 84. That is, the motor is modular and has two drivehead chambers that convert the power of the supplied hydraulic fluid to mechanical form, usually rotary motion. Both driveheads are joined by coupling 83 to the impeller of blower 82. It is thus seen that the power from both driveheads combines to motivate the blower. The blower accepts an intake of suction air 46 and discharges pneumatic conveying air 49. In the illustrated embodiment, all of the spent fluid from drive head 86 returns to reservoir 75 through line 88. Spent fluid 89 from drivehead 87 moves to regulator 85 which diverts a portion not needed to operate other auxiliary equipment on the trailer to the reservoir through line 81. Trailer-mounted auxiliary equipment driven by hydraulic fluid, include the rotary feed valve, discharge and conveyors. These are collectively represented schematically in FIG. 3 only by rotary feed valve unit 90. Fluid 92 needed to drive the auxiliary equipment passes on to auxiliary hydraulic motors 94 which are coupled to respective auxiliary equipment pieces. Fluid spent from driving the auxiliary functions (collectively, shown as 96) is also returned to the reservoir. Preferably to minimize the number of tractor-to-trailer hydraulic hoses, the separate fluid return flows 81, 88 and 96 are collected in a common return header 97 which runs into the fluid reservoir. The return header is represented by hose 53 in FIG. 2.

The disclosure herein of tandem pump head power takeoff units and dual drivehead hydraulic motors is optional and non-limiting of the invention. Preference is given to multi-sectioned hydraulic pumps and motors because such equipment is prevalent in some segments of the poultry feed distribution industry. Perhaps such multi-headed hydraulic equipment gained acceptance because they conveniently generated multiple hydraulic flows that could be utilized separately for the variety of different (i.e., rotary feed valve, and conveyor) control functions on the trailers. It should be understood that any style of hydraulic pump and motor of adequate performance characteristics is suitable for use in this invention.

By way of example, the hydraulic PTO for driving the trailer-mounted hydraulically operated blower of this invention can provide hydraulic fluid output of about 2250 psi and about 25-30 gpm. Typically, the PTO operates at about 1450 rev./min. Representative examples of the type of equipment components that can be adapted for use with this invention are the Parker Hydraulics tandem gear motors PGM620 series (Parker Hannifin Corporation, Youngstown, Ohio) for the dual drivehead hydraulic motor and DuroFlow® Positive Displacement Lobe Blowers/Vacuum Pumps of industrial series 45 (Gardner Denver Blower Division, Peachtree City, Ga.). The DuroFlow Model 4509 is exemplary for being capable of providing at about 3,000 rpm vacuum performance of about 500 cfm with about 27 BHP at 16 in. Hg. vacuum and pressure performance of about 500 cfm with about 52 BHP at 15 psig pressure.

From the foregoing it should be apparent that a feed supplier can greatly simplify the logistics of operation by having a fleet of substantially uniformly equipped tractors. With respect to feed delivering and picking up, these tractors have the customary hitches for drawing a trailer and a hydraulic PTO unit to supply pressurized hydraulic fluid to the trailer. The supplier also provides as many delivery trailers and one or more pick-up trailers as may be needed in service. The delivery trailers are primarily designed to haul up to large quantities of fresh food from the suppliers stock to the growers' bins. They mainly comprise a tank which may be subdivided with baffles or compartmentalized, a boom and conveyors such as screw-type conveyors for moving the feed from the delivery tank to the destination bin. The pick-up trailer or trailers are equipped substantially as described above and as shown in FIG. 2. Any of the supplier's tractors ordinarily adapted to haul a delivery trailer can thus also operate a pick-up trailer.

It may be further understood that the use of hydraulics to drive the pick-up trailer-mounted blower eliminates the need to use a mechanical drive for the blower that incorporates a rubber drive belt. Consequently, in the event that the pneumatic conveyor lines on the trailer plug with solids accidentally, there will be no belt to degrade from overheating. Because the blower can continue to run despite such a plug, the suction and discharge lines 49 and 46, (FIG. 2), respectively, can be fitted with pressure relief valves to admit or discharge air to atmosphere under such circumstances. Then the operator can sense the escape of air through the relief valves, shut down the system and clean out the plugged transfer lines. The need to replace a belt is thus avoided.

Figure 4:
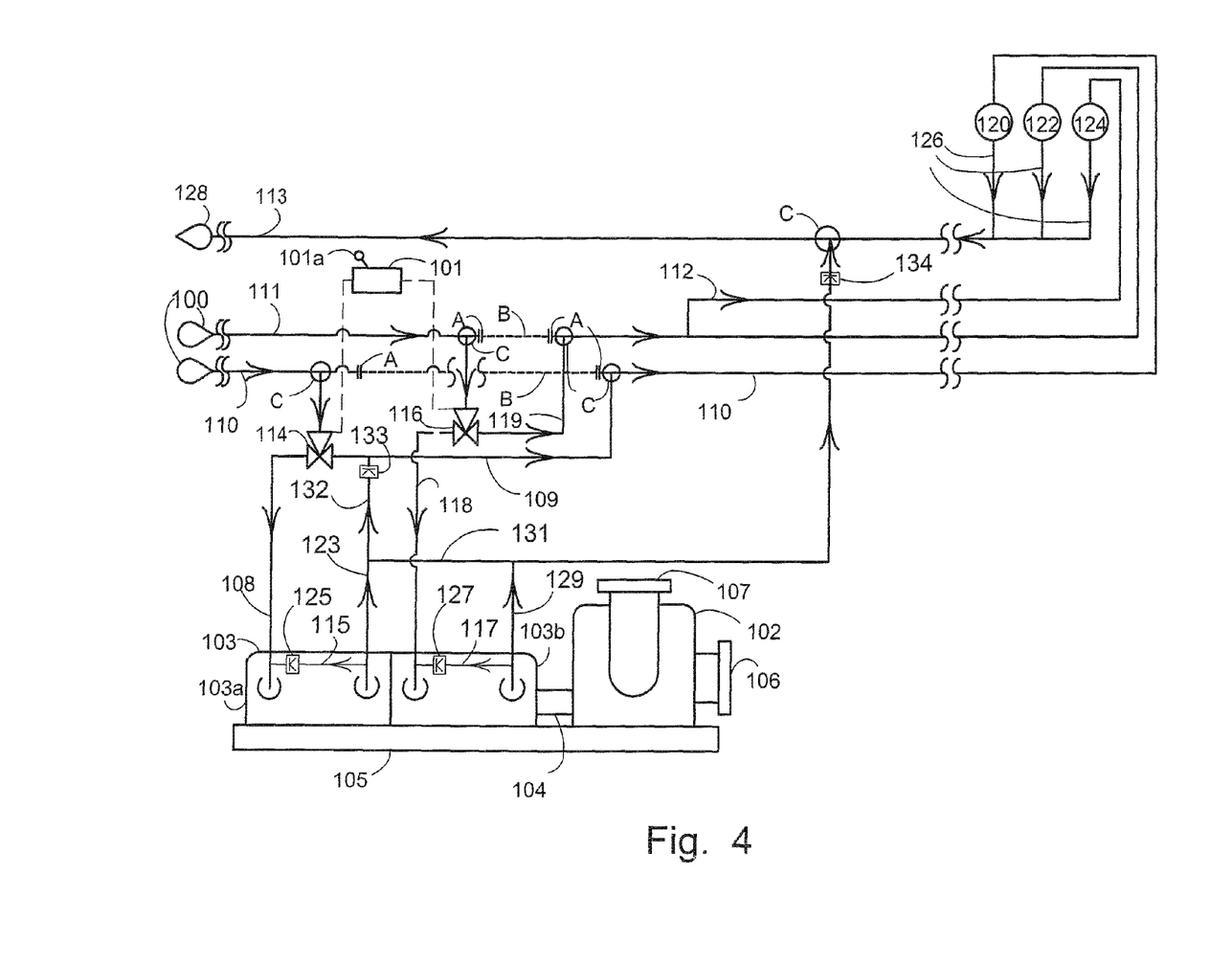
FIG. 4 is a schematic diagram of the hydraulic fluid flow routing of a pre-existing bulk feed delivery trailer retro-fitted with a hydraulically driven blower according to an embodiment of this invention.
Figure 5:
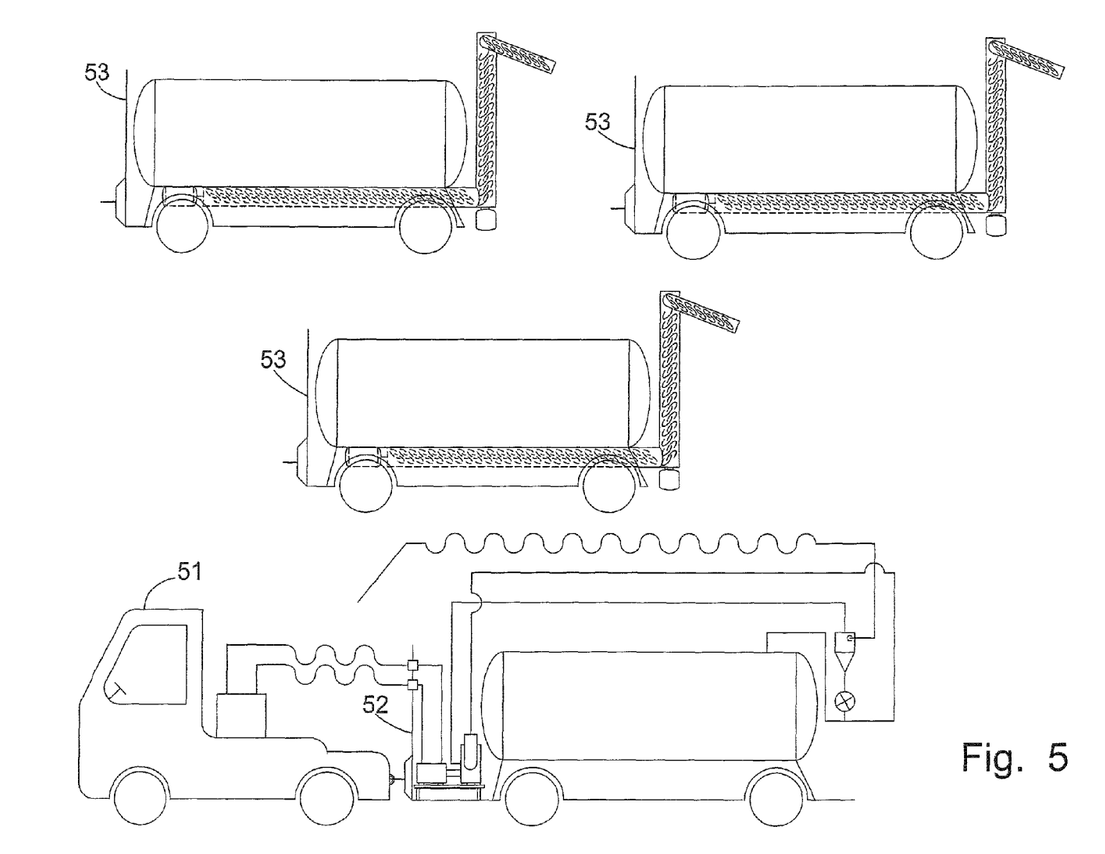
FIG. 5 is a schematic diagram of a mobile transfer system according to this invention including a conventional delivery tractor 51, a plurality of conventional delivery trailers 53, each of which is operable by tractor 51, and a novel pick-up and delivery trailer 52 (shown without unloading screw conveyors) which is also operable by tractor 51.

The novel system can be easily retroactively fitted to feed delivery tank trailer in common use very simply as can better be understood with reference to FIG. 4. The blower 102 and tandem hydraulic drive motor 103 are mounted on a support 105 and linked by drive shaft 104. The blower air intake port and air discharge port are labeled 106 and 107, respectively. It has been found convenient to mount the support under the trailer carriage and preferably near the forward end of the trailer for ease of access for maintenance. Pre-existing hydraulic fluid transfer lines 110, 111, 112 and 113, are typically rigid metal pipes mounted on one side of the trailer and run horizontally along the length of trailer. Transfer lines 110-112 carry pressurized hydraulic oil 100 from a conventional hydraulic power takeoff unit (PTO), not shown, mounted on the tractor. The pressurized oil is conducted by the transfer lines toward the rear of the trailer to actuate the rotary feed valve 120, the discharge conveyors 122, and the discharge boom 124. Spent oil 126 at slightly lower pressure from each of the service functions is collected in return transfer line 113. This line moves the oil toward the front of the trailer where it is sent to the reservoir 128 of the PTO on the tractor.

Prior to modification to install the novel hydraulically driven blower on the trailer, transfer lines 110 and 111 are continuous from the hydraulic hose connection to the tractor at the front of the trailer to the service functions 120 and 122, respectively. To power the hydraulic drive for the blower on the trailer, these transfer lines are cut and stopped with pipe blanks at points A. Sections of pipe B between the blanks are removed. Appropriate pipe fittings are installed in the transfer lines at points C to carry fluid to and from the blower hydraulic drive. Two new manual three-way valves 114 and 116 are mounted on the trailer frame at a convenient position for operation by the trailer operator.

The following hydraulic fluid lines are installed between the transfer lines and the hydraulic drive 103. For a newly fabricated trailer, these lines should be permanent, rigid metal constructions. However, for retroactively fitting an existing trailer, installation can be expedited by making up the hydraulic fluid lines to the drive with good quality, suitably pressure-rated flexible hydraulic fluid transmission hoses. Pressurized hydraulic fluid from line 110 is directed to the common port of three-way valve 114. One outlet port of this valve supplies first head 103a via line 108. The second output port connects to the continuation of transfer line 110 via line 109. Each three-way valve 114 and 116 is configured such that fluid can flow from the common port to only one of the outlet ports at any time. Thus fluid can either flow through valve 114 to hydraulic drive head 103a or to the rotary valve service 120 via line 110 depending upon which way the valve is set. To drive the blower, the valve should be set to direct the fluid into line 108. Similarly, oil supply from line 111 is diverted into the common port of valve 116. One outlet port of this valve connects to second drive head 103b via line 118 and the other outlet port connects via line 119 back into transfer line 111 rearward of the removed section B. To operate the blower, the valve is set to direct the hydraulic fluid supply through line 118. Valves 114 and 116 can be made to be independently operable, however, preference is given to linking the valves such that a single control 101, such as a lever arm 101a, will operate both valves simultaneously. It would be highly unusual to set one valve cause flow to the blower drive and the other valve to bypass the blower drive. Therefore linking the valves simplifies the task of the operator to direct all hydraulic fluid flow to the blower drive or to bypass the drive with a single action. Hydraulic drive heads 103a and 103b each respectively have a pressure equalization line 115 and 117 and a flow check valve 125 and 127. These lines are provided to protect the drive heads from a sudden shock that might occur when valves 114 and 116 are switched to bypass the blower to stop the blower after a feed pick-up operation has loaded excess feed into the trailer tank. When the three-way valves are switched high pressure of fluid in the drive head inlet lines 108 and 118 lower immediately. However, higher pressure fluid is permitted to flow back from the respective drive head discharge lines 123 and 129. This returning fluid allows the drive heads to continue to turn and to gracefully slow to a stop. At normal operation, the check valves prevent hydraulic fluid from flowing directly to the drive head discharge from the drive head inlet (e.g., to 123 from 108). While the blower is operating, all of the spent hydraulic oil discharging from one of the drive heads, e.g., 129 oil from head 103b, flows via line 131 to the return transfer line 113 which transfers the fluid to the power takeoff unit reservoir 128 on the tractor. A portion of the spent hydraulic oil from the other drive head, e.g., 123 oil from head 103a, is used to operate the rotary valve 120 while the blower is in operation. This oil is diverted to transfer line 110 via line 132. There it passes to the rotary valve drive and is ultimately recovered through the return transfer line 113. The remainder of the spent oil (123) from drive head 103a is returned to the reservoir through line 131. A one-way flow check valve 133 in line 132 prevents high pressure hydraulic oil from flowing into the drive head via line 123 when the three-way valve is set to bypass the blower.

In operation to pick up bulk feed particles, the trailer is connected to any tractor having a hydraulic power takeoff unit suitably sized to drive the blower and is hauled to the pick up site. If not already done, the hydraulic hoses 52, 53 (FIG. 2) are connected to the corresponding transfer lines on the trailer and the three-way valves are set to cause fluid to flow into the blower drive heads via lines 108 and 118. The tractor's power takeoff unit is energized which activates the blower. Rotary valve 120 also operates due to hydraulic oil flowing through line 133. The operator can then vacuum sweep up the excess feed particles and load them into the trailer tanks. When loading is completed, the power takeoff unit is shut down and the blower stops operating. The trailer can then be hauled to a new location where the excess feed can be unloaded. To carry out unloading, the operator sets the three-way valves 114 and 116 to the blower bypass positions. When the power takeoff unit on the tractor is started, these valve settings cause the fluid to flow from transfer line 110 through valve 114 into line 109 and further into the continuation of transfer line 110 where it activates the rotary valve 120. Similarly, hydraulic fluid flows from transfer line 111 through valve 116 to the continuation of transfer line 111 and transfer line 112 via line 119. This fluid operates the discharge conveyors 122 and boom positioning mechanisms 124 to unload the feed from the tanks. A one-way flow check valve 134 in line 131 (along with check valve 133) prevents spent hydraulic oil in return transfer line 113 from flowing into the blower drive heads. Thus the operator can maneuver the boom and operate the discharge conveyors to unload the trailer.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims. In particular, although the disclosure emphasizes the novel system for use in feed distribution services for poultry farming, it is contemplated that the novel technology can also be applied advantageously to the bulk transport of different materials in other industries, for example, the transport and distribution of feed to cattle, sheep, hogs and other livestock, the transport and distribution of seed and granular product of land farming and the bulk transportation of non-agricultural materials such as chemicals.

What is claimed is:

1. A mobile transfer system for a flowable bulk material, the system comprising a mobile cargo pick-up trailer comprising
    (a) a towing connector for removably hitching the mobile cargo pick-up trailer to a tractor,
    (b) a tank which is effective to hold an amount of the flowable bulk material,
    (c) a pneumatic pick-up conveyor operative to move the flowable bulk material into the tank from a source separate from the mobile cargo pick-up trailer,
    (d) a blower mounted on the mobile cargo pick-up trailer, the blower being operative to provide a conveying flow of air to the pneumatic pick-up conveyor, and
    (e) a hydraulically driven motor mounted on the mobile cargo pick-up trailer and close coupled to the blower such that the motor drives the pneumatic pick up conveyor
in which the hydraulically driven motor is operated by hydraulic fluid supplied by a hydraulic power takeoff unit and no hydraulic power takeoff unit is present on the mobile cargo pick-up trailer.

2. The system of claim 1 further comprising a tractor comprising a hitch operative to removably mate with the towing connector of the mobile cargo pick-up trailer.

3. The system of claim 2 in which the tractor comprises a hydraulic power takeoff unit and the hydraulically driven motor on the mobile cargo pick-up trailer is in fluid communication with the hydraulic power takeoff unit on the tractor such that hydraulic fluid supplied by the hydraulic power takeoff unit activates the hydraulically driven motor.

4. The system of claim 3 comprising a plurality of the mobile cargo pick-up trailers and at least one tractor having the hydraulic power takeoff unit mounted thereon and the tractor further comprising a hitch operative to removably mate with the towing connector of any of the mobile cargo pick-up trailers, in which the hydraulic power takeoff unit of the at least one tractor can drive the hydraulically driven motor of any of the mobile cargo pick-up trailers.

5. The system of claim 4 comprising a plurality of tractors and in which the hydraulic power takeoff unit of each tractor can drive the hydraulically driven motor of any of the mobile cargo pick-up trailers.

6. The system of claim 5 which comprises more mobile cargo pick-up trailers than tractors.

7. The system of claim 1 in which the flowable bulk material consists essentially of dry granules.

8. The system of claim 7 in which the flowable bulk material is poultry feed.

9. The system of claim 1 further comprising a plurality of mobile cargo delivery trailers, each mobile cargo delivery trailer (i) having a towing connector for removably hitching to a tractor and (ii) being inoperable to pick up the flowable bulk material, and a plurality of tractors each tractor comprising (i) a hitch operative to removably mate with the towing connector of the mobile cargo pick-up trailer or any of the mobile cargo delivery trailers and (ii) a hydraulic power takeoff unit,
    in which any of the tractors is capable of mating to and drawing any one trailer independently selected from among the mobile cargo pick-up trailer and the mobile cargo delivery trailers by connection of the towing connector and hitch, and
    in which the hydraulic power takeoff unit is effective to operate the hydraulically driven motor for the blower of the mobile cargo pick-up trailer.

10. The system of claim 1 in which the mobile cargo pick-up trailer further comprises (i) hydraulically driven screw conveyors and booms adapted to discharge the flowable bulk material from the mobile cargo pick-up trailer, (ii) at most 2 three-way valves each valve having one inlet port and two outlet ports, (iii) first hydraulic fluid transfer lines in fluid communication between the hydraulic power takeoff unit and the one inlet port of each three-way valve, (iv) second hydraulic fluid transfer lines in fluid communication respectively between a first outlet port of each three-way valve and a hydraulic fluid inlet port of the hydraulically driven motor, (v) third hydraulic fluid transfer lines in fluid communication respectively between a second outlet port of each three-way valve and motors for the hydraulically driven screw conveyors and booms, and (vi) a single control means for simultaneously operating the at most 2 three-way valves such that one operator action is effective to switch function of the mobile cargo pick-up trailer between (a) flowable bulk material pick-up service in which the hydraulic fluid energizes the hydraulically driven motor of the blower, and (b) delivery service in which the hydraulic fluid energizes the hydraulically driven screw conveyors and booms.

* * * * *